United States Patent [19]
Fry

[11] Patent Number: 5,392,732
[45] Date of Patent: Feb. 28, 1995

[54] SQUIRREL PROOF BIRD FEEDER

[76] Inventor: George E. Fry, Box 10-A1 Rd. 1, Williamstown, Pa. 17098

[21] Appl. No.: 192,351

[22] Filed: Feb. 7, 1994

[51] Int. Cl.⁶ .................................................. A01K 5/00
[52] U.S. Cl. ................................. 119/57.9; 119/52.3
[58] Field of Search ................. 119/52.3, 57.9, 59, 119/63; 43/112

[56] References Cited

U.S. PATENT DOCUMENTS

| | | | |
|---|---|---|---|
| 2,856,898 | 10/1958 | Doubleday et al. | 119/57.9 |
| 4,188,913 | 2/1980 | Earl et al. | 119/57.9 |
| 4,441,457 | 4/1984 | Sanford | 119/57.9 |
| 4,765,277 | 8/1988 | Bailey et al. | 119/57.9 |
| 4,767,088 | 8/1988 | Fielder | 119/57.9 |
| 5,150,665 | 9/1992 | Boaz | 119/52.3 |
| 5,191,857 | 3/1993 | Boaz | 119/57.9 |
| 5,195,460 | 3/1993 | Loken | 119/57.3 |
| 5,269,091 | 12/1993 | Johnson et al. | 43/112 |
| 5,285,747 | 2/1994 | Caldine | 119/57.9 |
| 5,289,796 | 3/1994 | Armstrong | 119/57.9 |

*Primary Examiner*—Paul J. Hirsch

[57] ABSTRACT

A squirrel proof bird feeder including an electrical deterrent to deny squirrels access to a bird feeding station. The squirrel proof bird feeder comprises a bird feeding station, a conductive support pole attached to the bird feeder at one end and embedded within the ground at an opposing end, and a conducting plate affixed to, but electrically isolated from, the conductive support pole, and a regulating power supply providing electrical shock stimuli to animals contacting the conductive plate member and any earth ground, and more particularly the conductive support pole. In an alternate embodiment a plurality of isolated conductive plates are employed to provide a range of heights for the purpose of shocking a corresponding range of animal sizes. Yet another alternate embodiment employs a sensor which detects the imminent approach of an animal and activates the electrical p[power supply deterrent only when animals are present.

2 Claims, 4 Drawing Sheets

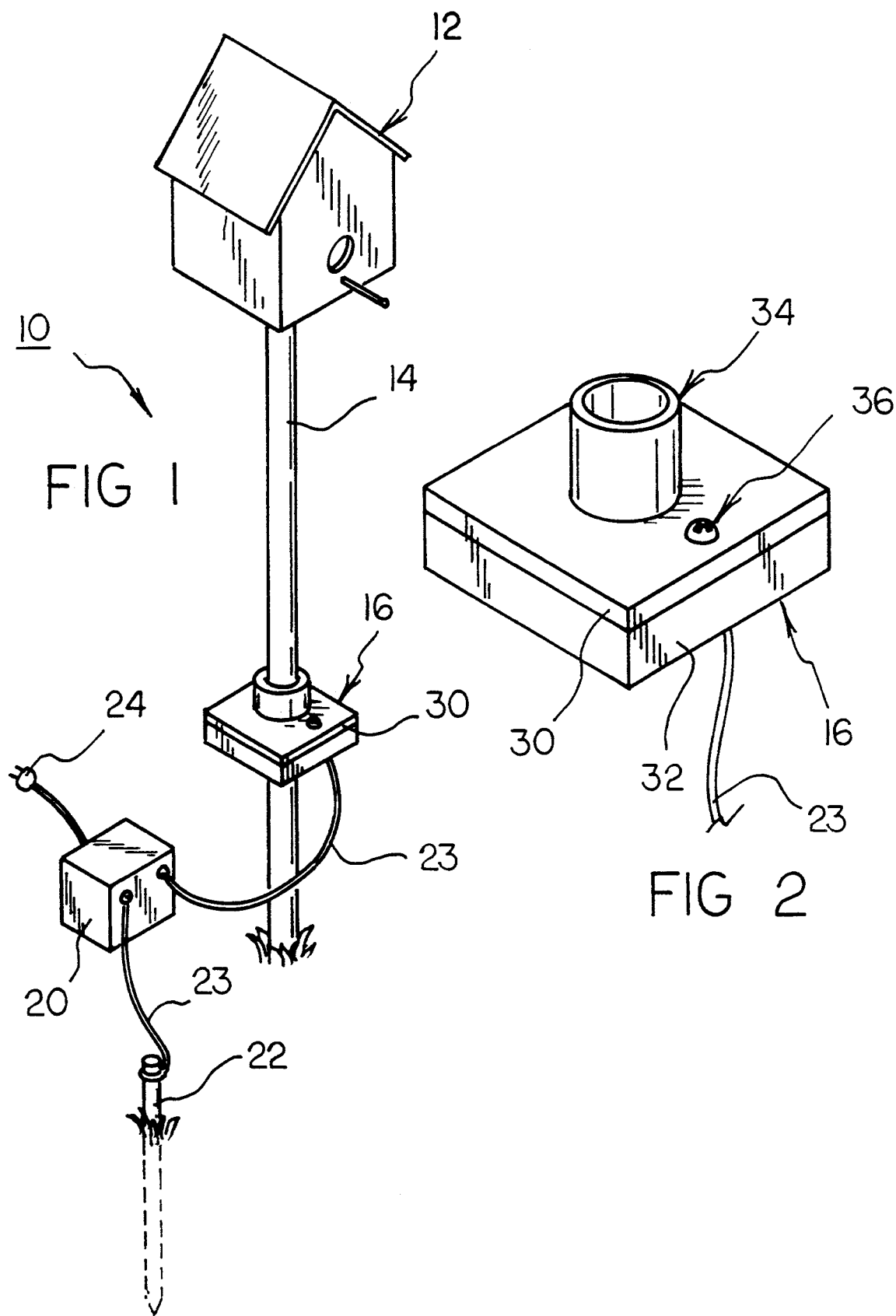

SQUIRREL PROOF BIRD FEEDER

BACKGROUND OF THE INVENTION

1. Field of the Invention

The present invention relates to bird feeders and more particularly pertains to a squirrel proof bird feeder which may be employed to preclude access of squirrels and other small animals from accessing bird feeding stations.

2. Description of the Prior Art

The use of squirrel proof bird feeder is known in the prior art. More specifically, squirrel proof bird feeders heretofore devised and utilized for the purpose of preventing squirrels from gaining access to bird feed in feeding apparatus are known to consist basically of familiar, expected and obvious structural configurations, notwithstanding the myriad of designs encompassed by the crowded prior art which have been developed for the fulfillment of countless objectives and requirements.

The present invention is directed to improving devices for feeding birds without permitting squirrels to access feed materials in a manner which is safe, secure, economical and aesthetically pleasing.

For example, U.S. Pat. No. 4,541,362 to Dehls disclose a squirrel-proof selective bird feeder. The Dehls invention comprises a feeding station having a weight sensitve aperture dispensing feeding materials only when the weight of a feeding bird is detected to be within certain limits, and in particular access to feed materials is prevented should a heavy animal such as a squirrel attempts to feed. The present invention is an electrically powered device which provides a shock deterrent to squirrels or other climbing animals should they attempt to access the feeding station.

In U.S. Pat. No. 5,156,112 to Brown a squirrel resistant bird feeder employing a weight discriminating technique for precluding access to feed materials by squirrels and other larger animals is disclosed. The present invention employs an electrical deterrent to squirrel and other climbing animal use of bird feeders and is in no manner dependent on bird weight. Feeders using bird weight to enable access to feed materials may respond adversely when heavier or a multiplicity of small birds are attending the feeder simultaneously, and furthermore feeders using mechanical principles such as the Brown patent are susceptible to jamming and consequent inoperability.

In U.S. Pat. No. 4,867,104 to Vandiver a bird feeder with squirrel guard is described. The Vandiver patent comprises a series of freely pivoting rollers disposed upon the perimeter of a substantially rectangular form wherein the form is affixed to an existing bird feeder and the entire assembly is affixed atop a support pole. The rollers establish a non-graspable member for squirrels climbing the support pole in order to gain access to the bird feeder station, yet birds landing at the feeder are unaffected by the pivoting rollers. The present invention employs a high voltage electrical field to discourage squirrels and other climbing animals from gaining access to the bird feeder.

In U.S. Pat. No. 4,323,035 to Piltch a squirrel-proof bird feeder is disclosed for preventing squirrels from feeding at bird feeders using either low frictional coefficient portions of the bird feeder support structure which cause the squirrel to fall, or a pivoting feeder having feed access apertures and internal baffles which, in combination with the pivoting effect, serves to minimize the quantity of feed material a squirrel can acquire and cause the squirrel to fall by rotating under the influence of the squirrel's weight. A disadvantage in this prior art lies in the use of mechanical devices which are prone to weather induced jamming and corrosion thereby permitting access to the feed materials. And the frictional surfaces designed to slidably engage the claws of small animals may become crazed or corroded which would permit a squirrel to climb these regions without falling. The present invention uses an electrical deterrent and is not susceptible to corrosion or jamming and therefore comprises a significant advance in the state-of-the-art.

U.S. Pat. No. 5,163,382 to Morrison discloses a bird feeder apparatus. The disclosure teaches a selectively feeding bird feeder wherein an outer housing having a bird perch is affixed to an inner housing containing bird feeding materials by a spring member. Both inner and outer housings are perforated by holes suitably sized to permit access to feed materials as long as the holes are substantially in alignment. When a bird is perched for feeding the holes are aligned, however should a larger animal such as a squirrel attempt to acquire food, the holes move out of alignment and food access is denied. The disclosure makes no provision for application of a deterrent stimulus to any portion of the feeding apparatus. There is no teaching to permit access to feed materials on an unlimited basis to birds while precluding the feeding of squirrels and other small climbing animals. The present invention employs an electrical stimulus deterrent to prevent squirrels and other small animals from gaining access to bird feeding stations.

In this respect, the squirrel proof bird feeder according to the present invention substantially departs from the conventional concepts and designs of the prior art, and in so doing provides an apparatus primarily developed for the purpose of denying squirrels access to bird feeding stations.

Therefore, it can be appreciated that there exists a continuing need for new and improved squirrel proof bird feeder which can interface with a diverse variety of bird feeder types. In this regard, the present invention substantially fulfills this need.

As illustrated by the background art, efforts are continuously being made in an attempt to improve bird feeders which deny squirrels access to feed materials. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of squirrel proof bird feeder now present in the prior art, the present invention provides an improved squirrel proof bird feeder construction wherein the same can be utilized for discriminate feeding of birds with the exclusion of squirrels and other larger climbing animals. As such, the general purpose of the present invention, which will be described subsequently in greater detail, is to provide a new and in, proved squirrel proof bird feeder apparatus and method which has all the advantages of the prior art squirrel proof bird feeders and none of the disadvantages.

The invention is defined by the appended claims with the specific embodiment shown in the attached drawings. For the purpose of summarizing the invention, the invention may be incorporated into a pedestal bird feeder mount affixed to an elongate electrically conductive pole member having an electrically conductive plate base wherein the plate base is insulated from earth ground using a thick insulating spacer affixed to a second short pole section engaging the earth for the purpose of providing mechanical support of the entire assembly. The base plate is connected to one terminal of a regulating high voltage power supply which applies deterrent electrical power between the terminal and earth ground.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved squirrel proof bird feeder.

It is therefore an additional object of the present invention to provide a new and improved squirrel proof bird feeder which has all the advantages of the prior art squirrel proof bird feeders and none of the disadvantages.

It is another object of the present invention to provide a new and improved squirrel proof bird feeder which may be easily and efficiently manufactured and marketed.

It is a further object of the present invention to provide a new and improved squirrel proof bird feeder which is of a durable and reliable construction.

An even further object of the present invention is to provide a new and improved squirrel proof bird feeder which is susceptible of a low cost of manufacture with regard to both materials and labor, and which accordingly is then susceptible of low prices of sale to the consuming public, thereby making such squirrel proof bird feeders economically available to the buying public.

Still yet another object of the present invention is to provide a new and improved squirrel proof bird feeder which provides in the apparatuses and methods of the prior art some of the advantages thereof, while simultaneously overcoming some of the disadvantages normally associated therewith.

Still another object of the present invention is to provide a new and improved squirrel proof bird feeder not exhibiting a dependence on mechanical devices to perform the function of precluding squirrels and other small climbing animals from feeding.

Yet another object of the present invention is to provide a new and improved squirrel proof bird feeder using electrical stimuli to deter squirrels from gaining access to a bird feeding station.

Even still another object of the present invention is to provide a new and improved squirrel proof bird feeder able to be adapted to a wide variety of existing and future bird feeder styles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the squirrel proof bird feeder showing the electrical interconnections and physical arrangement.

FIG. 2 is a perspective view of the squirrel proof bird feeder electrical isolation plate.

DESCRIPTION OF THE PREFERRED EMBODIMENT

Figure 3:
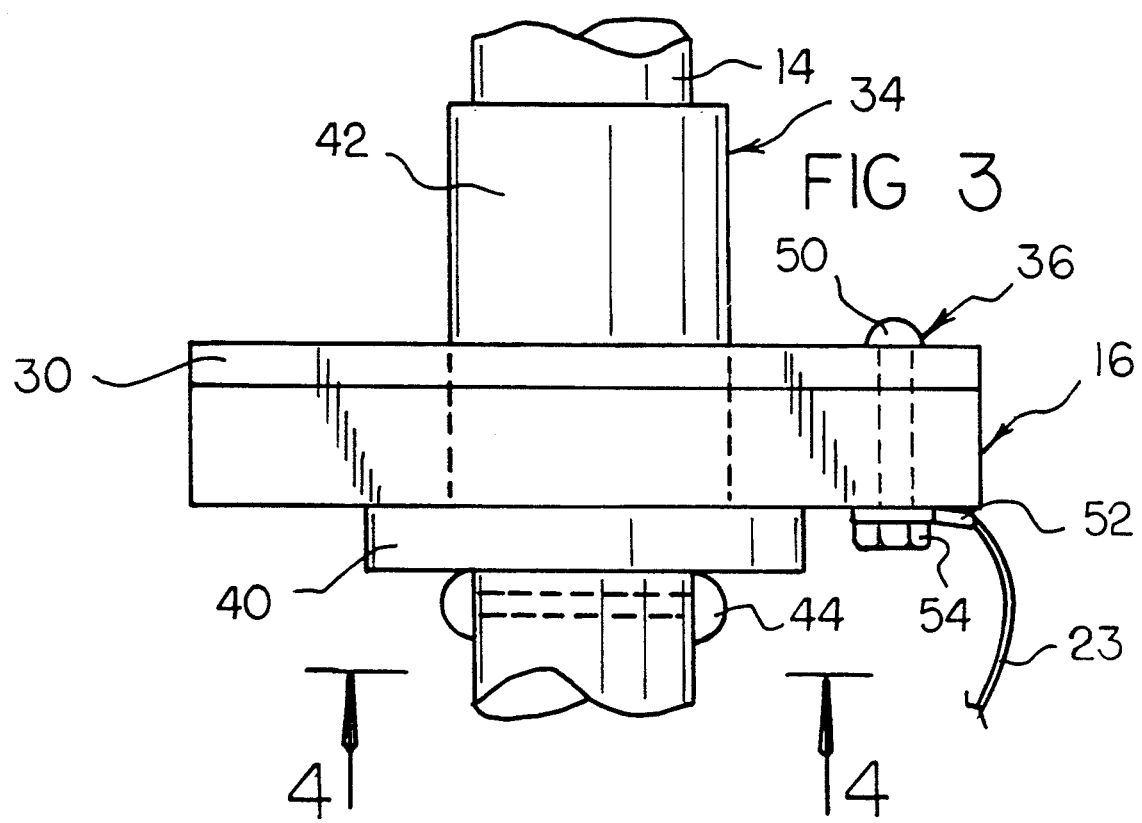
FIG. 3 is fragmentary side elevational view of the squirrel proof bird feeder showing the electrical isolation plate.

With reference now to the drawings, and in particular to FIG. 1 thereof, a new and improved squirrel proof bird feeder embodying the principles and concepts of the present invention and generally designated by the reference numeral 10 will be described.

From an overview standpoint, the squirrel proof bird feeder is adapted for use with diverse styles of bird feeders to prevent squirrels and other climbing animals from gaining access to the feed material. See FIG. 1. The squirrel proof bird feeder comprises a bird feeder 12, an electrically conductive support pole 14, an electrical isolation block 16, a high voltage regulating electrical power supply 20, and an earth ground 22. Activation of power supply 20 results in a strong electric field being disposed between support pole 14 and an electrified conductive plate member 30 thereby presenting a barrier discouraging animals from traversing from conductive plate member 30 to support pole 14 from which access to bird feeder 12 is achievable.

More specifically, it will be noted that the squirrel proof bird feeder 10 employs an electric field deterrent generally based on the principles of an electric fence wherein animals are contained within a perimeter by a single wire electrified by a high voltage regulating power supply. Bird feeder 12 may be selected from a wide variety of bird feeders and may simply comprise a planar shelf upon which seed or other feeding materials is placed. Bird feeder 12 is affixed to support pole 14 using fasteners such as screws or bolts, and furthermore support pole 14 may terminate in a flange portion engaging bird feeder 12 and having holes accepting screws or bolts.

Support pole 14 is electrically conductive and generally of metallic construction. Support pole 14 is driven into the ground or embedded in concrete with a substantial portion in contact with the earth thereby providing electrical earthing and physical support for the entire squirrel proof bird feeder 10. Support pole 14 must be electrically conductive and may be constructed from a variety of tubular conductors such as galvanized steel, copper, aluminum, or other metallic alloys.

The power supply 20 may be an electric fence supply or a supply specifically designed to power the squirrel proof bird feeder 10 at voltage, frequency, and maximum current levels determined to perform the task of discouraging squirrels and other animals. Input electrical power is provided through wall plug 24, or a small battery pack may be employed particularly when the bird feeder is far removed from distribution type electrical power sources.

Figure 4:
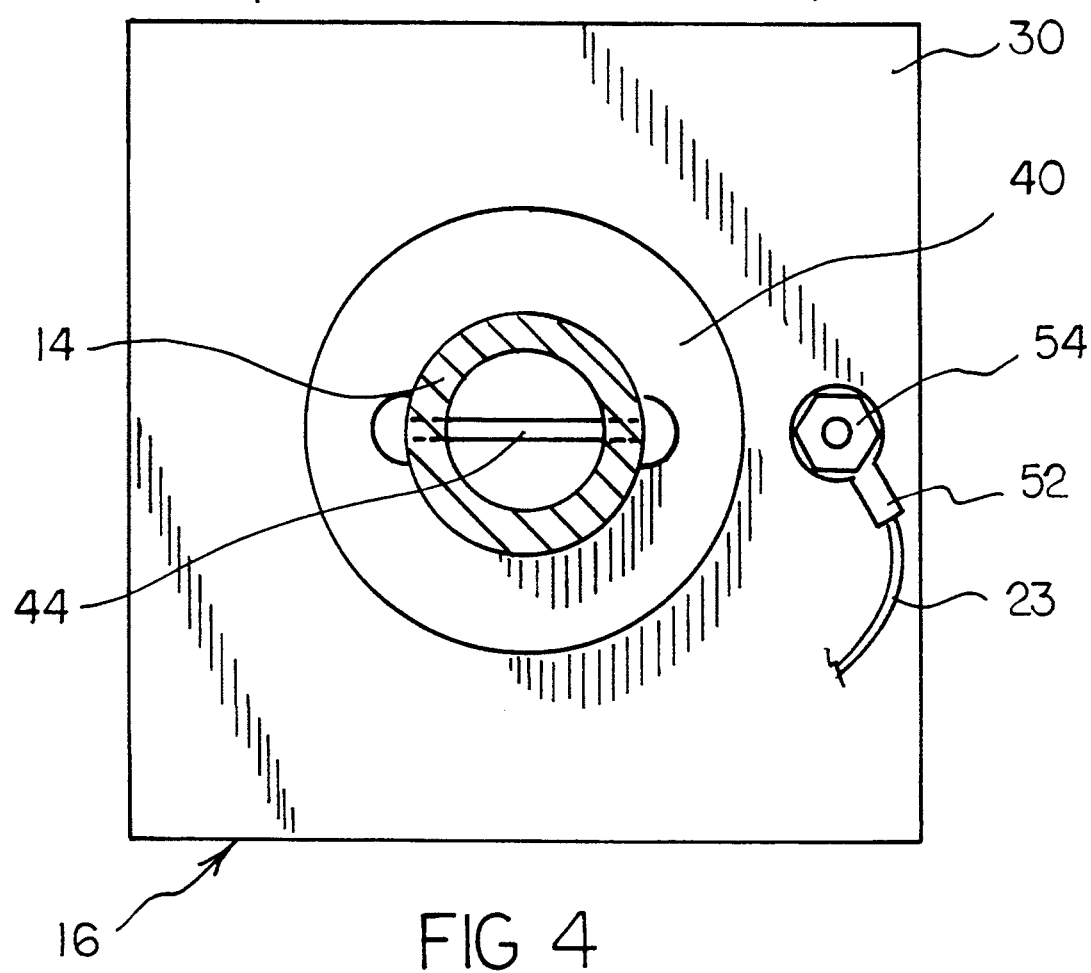
FIG. 4 is a sectional view of the squirrel proof bird feeder taken substantially upon the plane indicated by the section lines 4—4 of FIG. 3.
Figure 5:
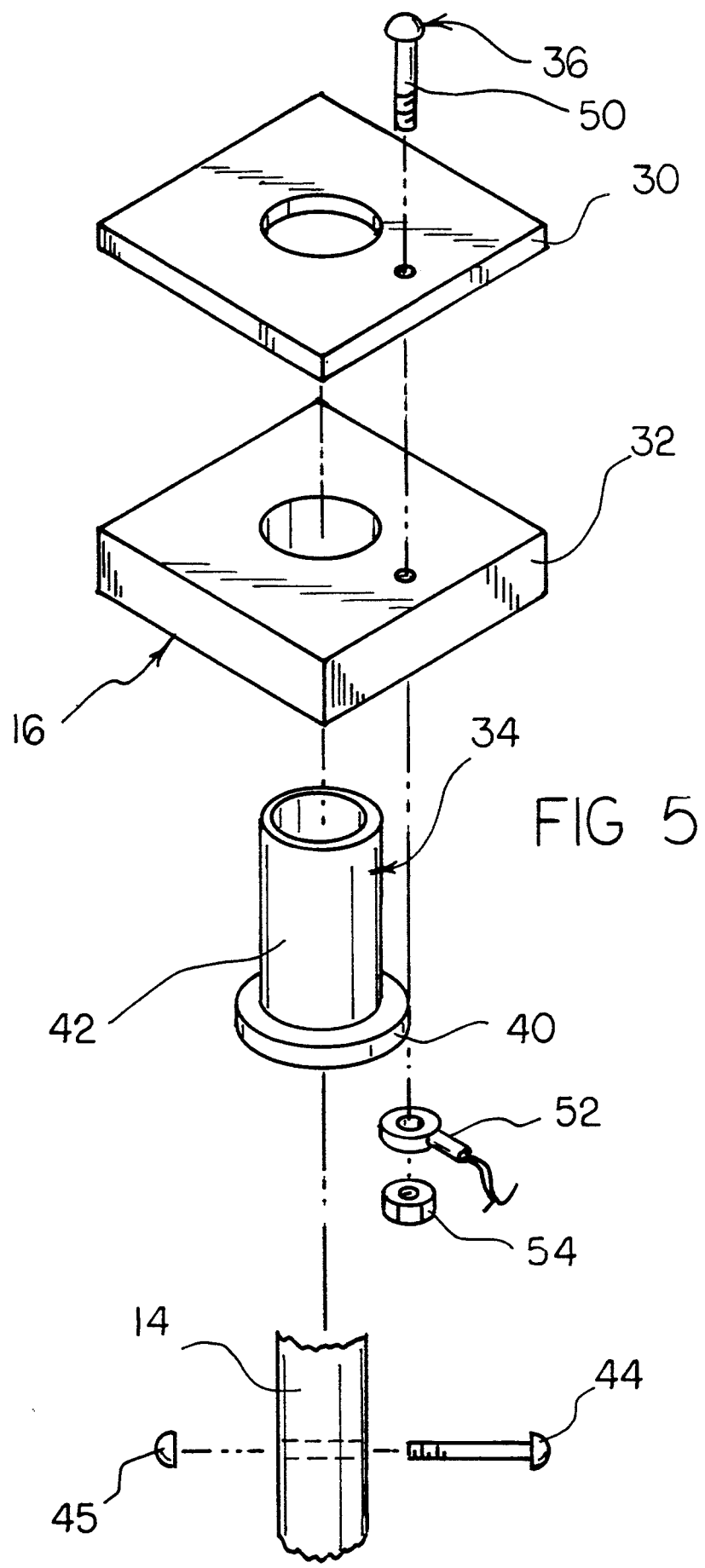
FIG. 5 is a fragmentary exploded perspective view of a squirrel proof bird feeder showing the electrical isolation plate.

Battery packs comprising one or more common cells such as three volt lithium batteries may be effectively used in this system primarily because there is negligible current flow when no animal completes the circuit from support pole 14 to the conductive plate member 30, and the frequency of circuit completions by animals is very small and repeat offenders are unlikely. The electrical output from power supply 20 is directed to earth ground 22 and the conductive plate member 30 of isolation block 16 by conductive wires 23. See FIGS. 2, 3, and 4.

Isolation block 16 provides an interface between the electrical power system comprising power supply 20 and a mechanical support system comprising grounding pole 18 and support pole 14. Isolation block 16 comprises conductive plate member 30, insulating plate member 32, support pole 14 insulating attachment collar 34, and electrical terminal 36. Insulating plate member 32 and collar 34 are composed of materials such as fluoropolymers, polyimides, polycarbonates or polymethylmethacrylates and may have colorants added for aesthetic appeal.

Insulating plate member 32 must have sufficient dielectric strength to preclude arcing or other forms of dielectric breakdown, referred to as electrical creep by those familiar with the art, during all weather and environmental conditions. Inclusion of an extended surface portion particularly in the form of a series of spaced insulating rings sealedly secured around collar 34 will mitigate adverse effects of weather and the environment by providing a longer electrical path requirement for electrical creep.

Collar 34 comprises a large diameter short portion 40 and a small diameter elongated portion 42 wherein the entire collar 34 is perforated by a through hole permitting loose engagement with support pole 14. Pin 44 is affixed to and passes through support pole 14 thereby engaging isolation block 16 in a manner which precluded movement of the block past the pin 44. Pin 44 is positioned to cause isolation block 16 to maintain a stationary position approximately one foot above ground level when support pole 14 fully engages the earth.

Provision for positioning pin 44 at other locations along support pole 14 thereby placing the conductive plate member 30 above the reach height of small children and pets can contribute to system safety. And furthermore pin 44 may comprise a rivet, bolt, or split pin as indicated by design considerations. If configured as a bolt pin 44 threadedly engages nut 45. Terminal 36 comprises a bolt member passing through electrical termination 52 and threadedly engaging nut 54. Lockwashers and other devices may be addended to terminal 36 as is required to reliably interconnect power supply 20 with conductive plate member 30.

Figure 6:
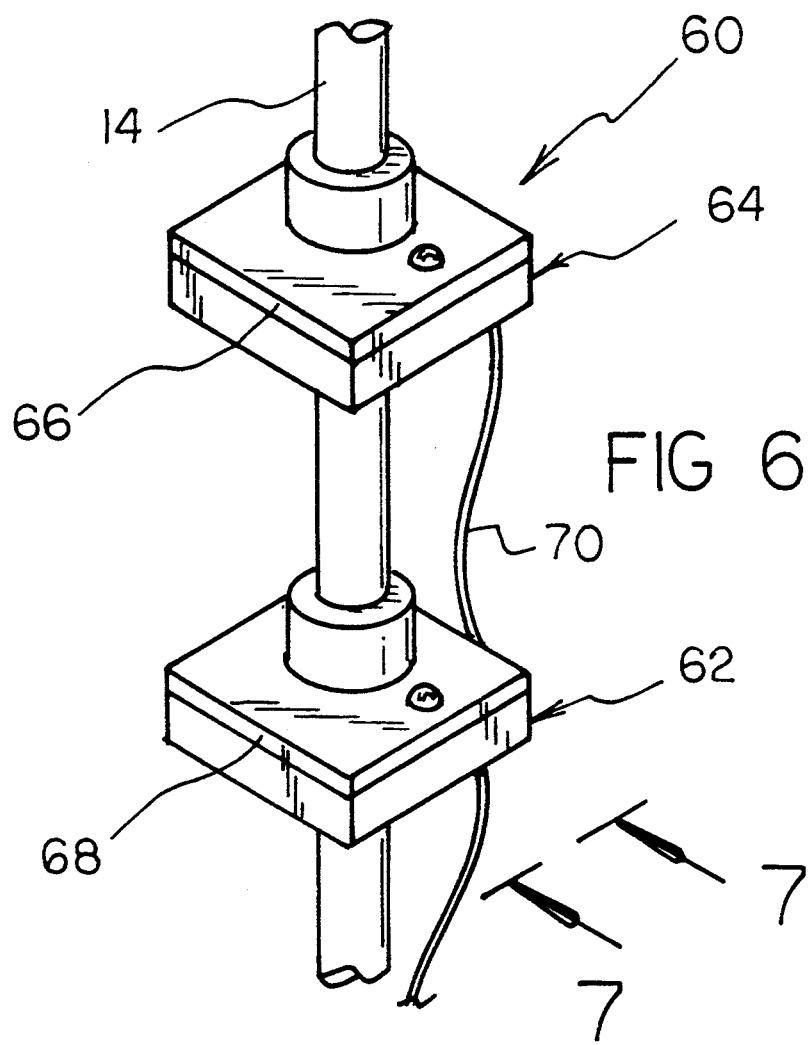
FIG. 6 is a fragmentary perspective view of an alternate embodiment of the squirrel proof bird feeder showing dual electrical plates.
Figure 7:
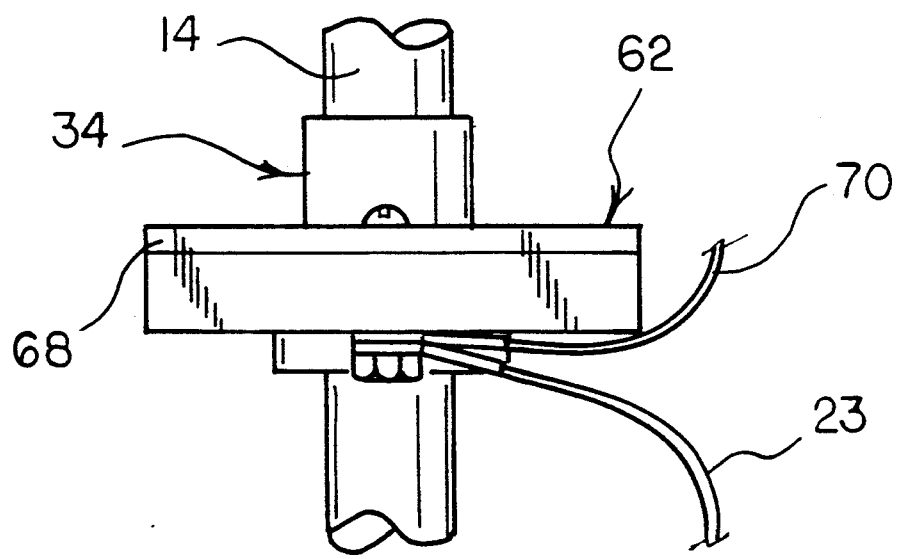
FIG. 7 is a fragmentary side elevational view of the alternate embodiment of a squirrel proof bird feeder taken substantially upon the plane indicated by section lines 7—7 of FIG. 6.

In an alternate embodiment of a squirrel proof bird feeder 60 two isolation blocks designated 62 and 64 are employed. See FIGS. 6 and 7. Isolation blocks 60 are separated by a linear distance along support pole 14 such that a taller climbing animal will engage the conductive plate member 66 of isolation block 64 thereby being denied access to bird feeder 12.

Conductive plate 68 of isolation block 62 is interconnected to the power supply 20 by conductive wire 28 and in a parallel electrical configuration to conductive plate 66 of isolation block 64 using electrical conductor 70. An alternate arrangement connects one output conductor of power supply 20 to conductive plate member 66 and the remaining output conductor to conductive plate 68. In this alternate arrangement a non-conductive support pole may be employed and the offending animal must touch both conductive plate members 66 and 68 simultaneously to receive an electrical shock.

In yet another alternate embodiment one or more sensors are employed to activate power supply 20 solely when an animal is present. In one embodiment support pole 14 and conductive plate member 30, or conductive plate members 66 and 68, form a capacitive sensor which detects the presence of an animal by an attendant change in surrounding space permittivity generated by the introduction of an animal body exceeding preset proportions.

Upon sensing the presence of an animal the power supply 20 is energized and operation as a deterrent ensues until the presence of an animal body is no longer sensed. Alternate sensors based on weight, infrared signature, optical beam interruption, acoustic, ultrasonic, and electromagnetic signature may be included. A sensor based system is particularly useful in battery powered self contained units for the purpose of extending battery lifetime by disabling all high voltage except in the presence of a potential offending animal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved squirrel proof feeder for denying squirrels access to bird feeding stations comprising:

an electrically conducting support member engaging the earth at one end and a bird feeder at the opposing end, an insulating member, the insulating member having an insulating collar having a flanged and non-flanged portion circumferentially engaging said electrically conducting support member and, whenever said conducting support member is operationally disposed in a usual and substantially vertical alignment, resting upon a stop member which is affixed to said conducting support member, and furthermore said insulating collar is disposed having said flanges portion engaging said stop member, a conductive plate member electrically isolated from said conducting support member by said insulating member and said insulating collar, the conductive plate positioned above said insulating member, and an electrical power source capable of deterring small animals by electric shock wherein said electrical power source is connected to an earth ground at one output and to said conductive plate at a second output there being a significant difference in electrical potential between the two outputs.

2. A new and improved squirrel proof feeder for denying access to bird feeding stations comprising:

an electrically conducting support member engaging the earth at one end and a bird feeder at the opposing end, an insulating member, the insulating member having an insulating collar having a flanged and non-flanged portion circumferentially engaging said electrically conducting support member and, whenever said conducting support member is operationally disposed in a usual and substantially vertical alignment, resting upon a stop member which is affixed to said conducting support meter, and furthermore said insulating collar is disposed having said flanged portion engaging said stop member, a conductive plate member electrically isolated from said conducting member by said insulating member, and said insulating collar, the conductive plate positioned above said insulating member, and, a sensor means which detects the presence of small animals and responds by an issuance of an electrical signal, and an electrical power source capable of deterring small animals by electric shock wherein said electrical power source is connected to an earth ground at one output and to said conductive plate at a second output therebeing, on command, a significant difference in electrical potential between the two outputs, and furthermore said electrical power source is enabled thereby producing output by application of the electrical signal issued by said sensor means and disabled thereby producing no output in the absence of said electrical signal.

* * * * *